Patented Feb. 6, 1951

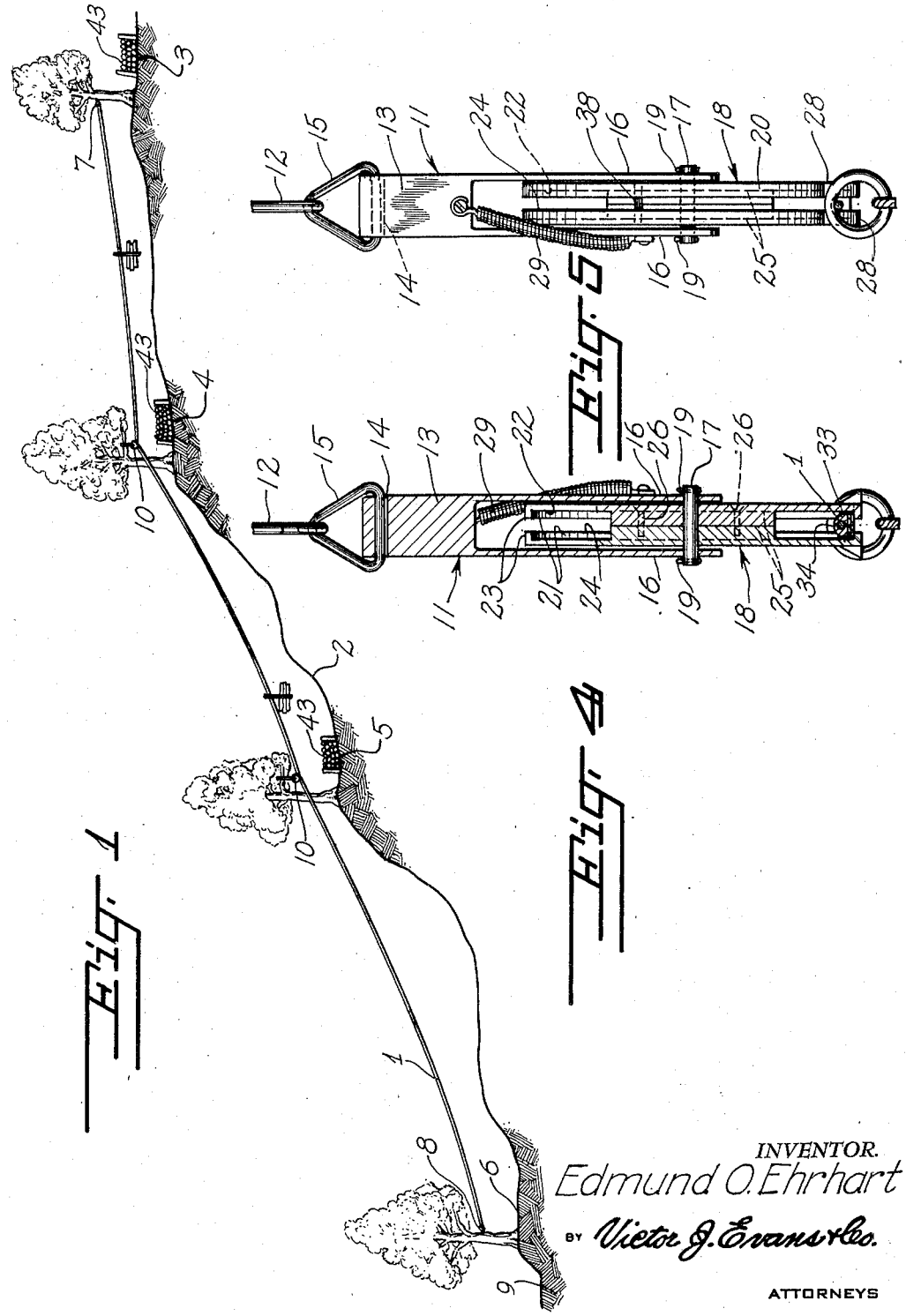

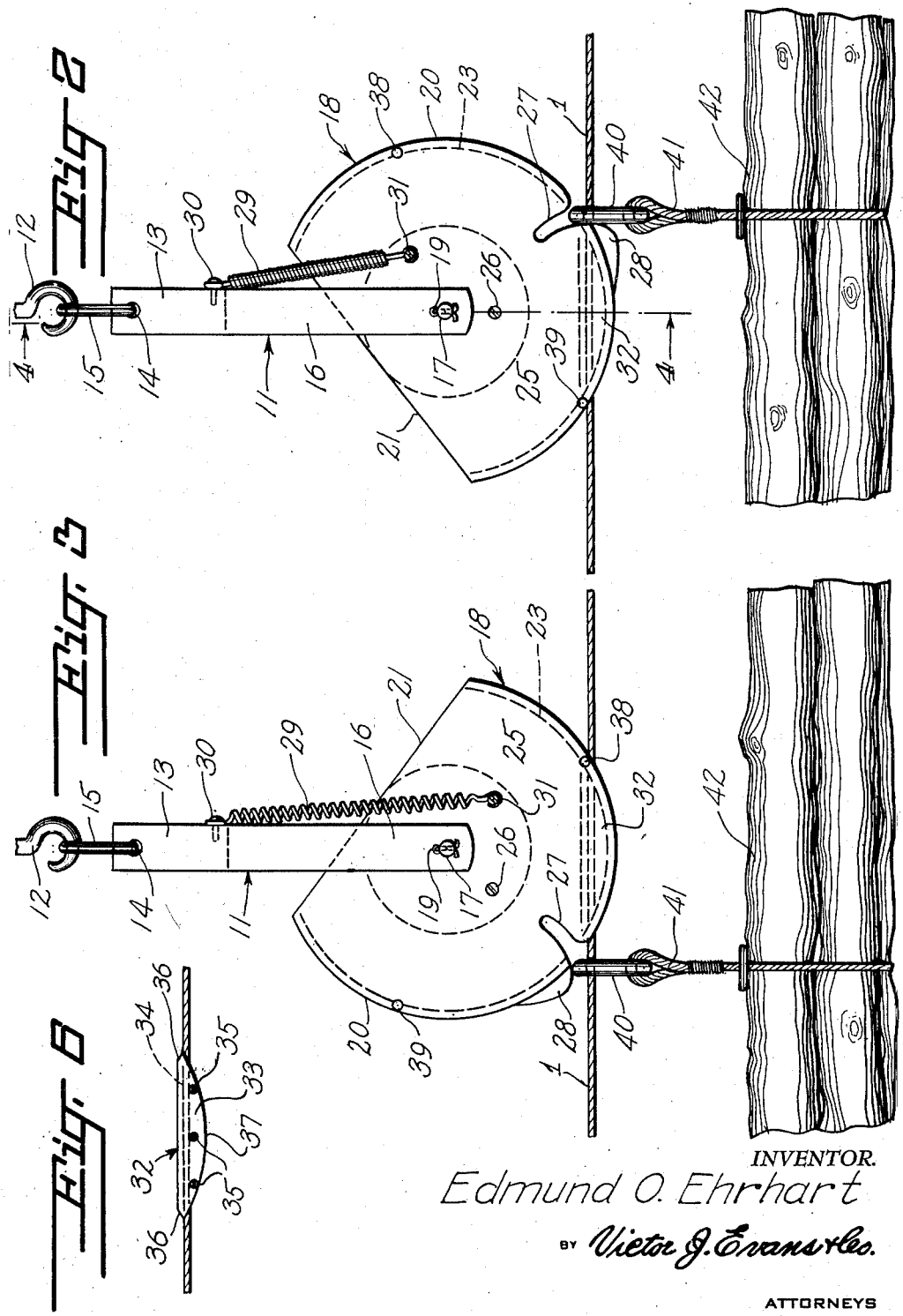

2,540,868

UNITED STATES PATENT OFFICE 2,540,868

INTERMEDIATE WIRE SUSPENSION WHICH BY-PASSES A MOVING LOAD

Edmund O. Ehrhart, Johnsonburg, Pa.

Application June 28, 1949, Serial No. 101,782

2 Claims. (Cl. 104—182)

My invention relates to an intermediate suspension means for an elevated wire or cable anchored at its ends, used to move or convey loads from one point to a distant point, in which the point or points of loading are usually inaccessible or difficult to reach with vehicles and the discharge point is a considerable distance therefrom so that the loads must be conveyed over terrain not provided with roads, and the object of the invention is to provide means for suspending the carrier wire or cable at one or more intermediate points and for by-passing a load moving along on said wire or cable while maintaining the same at a suitable elevation.

By way of example, billets of pulpwood, bolts or logs are sometimes, especially in rough mountainous terrain which is impassable or difficult of approach by vehicles, moved by gravity by hanging them on a ring which slides downhill on a wire or cable suspended at both ends. Since two point suspension makes a distinct limitation to the general usefulness of this practice by seriously limiting the length of the cable due to the sagging thereof between such points and the distance over which loads may be conveyed without dragging, my present invention is designed to overcome such difficulty by providing novel, simple and practical means for suspending the carrier wire or cable at necessary intermediate points to maintain the same properly elevated from the ground, so that the load may be conveyed or moved without impediment or dragging or requiring the use of several cables and unloading from one to another, by permitting by-passing of the intermediate suspension means by the moving load at the required intermediate suspension points and so constructing said intermediate suspension means as to permit the passage of the ring to which the load is attached, along the entire length of the carrier wire or cable and through or past the suspending device or devices, thereby increasing the possible length of such carrier wire or cable and the distance over which the loads may be conveyed.

An object of the invention is to provide means for suspending a carrier wire or cable of the type referred to, comprising a segmental rotor having means for suspending the same from an overhead support to permit partial turning thereof and having a grooved periphery forming an interior supporting track, means on the cable extending into the grooves and engaging the track to support the cable while supporting or holding the cable in suspension at all times and permitting turning of the rotor to by-pass a load, normally turn the rotor in an anti-clockwise direction, means to limit the anti-clockwise turning, means to limit the clockwise turning, said rotor having a mouth or recess extending into the same from its periphery to receive the load suspending ring as it moves along the cable to permit the ring to turn with the rotor and with its load to by-pass the suspension means and rotor and be automatically released or discharged as the ring and load move along the cable being checked or stopped, means on the rotor for insuring entry of the ring into the recess upon striking the rotor, and means fixed on the cable at the intermediate suspension point or points, in the form of a segment clamped to the cable cooperating with the groove and track of the rotor to maintain the cable in suspension at all times to support the moving load while permitting turning of the rotor in either direction to by-pass the ring and load and return of the rotor to normal position with the recess in ring receiving position to by-pass successive rings and loads suspended thereby from the cable whereby the loads may be dumped at a convenient common point adjacent a track or road for loading the same on a truck or other transporting vehicle for shipment to the desired destination.

Another object of the invention is to provide an intermediate suspension means for carrier cables which can be economically manufactured and readily assembled and suspended from an overhead support such as a tree, together with means on the carrier cable cooperating therewith for sustaining the load at all times while causing the load to by-pass the suspension means.

The invention consists in certain novel features of construction and combinations and arrangements of parts involving the intermediate carrier wire or cable suspension means, its rotor, means to hold the rotor in receiving position for a ring movable along the wire to by-pass the ring and a load hung therefrom by movement of the rotor to a position to release the ring in a clockwise direction and then, to automatically return to its initial position to receive and by-pass another ring and its load, by movement in an anti-clockwise direction, as will hereinafter be more fully pointed out, together with means on the carrier wire to give support thereto at all times in cooperation with a rotor serving the first mentioned functions in by-passing a moving load, and as set forth in the appended claims.

In the accompanying drawings, I have illustrated a complete example of a physical embodiment of my invention in which the parts are combined and arranged in accordance with a mechanism I have devised for the practical application of the principles of my invention. It will, however, be understood that changes and alterations are contemplated and may be made in these exemplifying drawings and mechanical structures, within the scope of my claims without departing from the principles of the invention.

Figure 1 is an elevation showing one method of using the intermediate carrier wire or cable suspension means in rough mountainous terrain and for by-passing loads.

Figure 2 is a side elevation of one embodiment of my invention with the rotor thereof in its normal position and the mouth or recess of the rotor in position to receive and by-pass the ring and load.

Figure 3 is a view similar to Figure 2 with the rotor in discharge or release position relative to the ring after by-passing the load.

Figure 4 is a vertical diametrical section at the plane of line 4—4 of Figure 2.

Figure 5 is an end elevation or edge view of the device as shown in Figure 2 looking at the right hand or entering side.

Figure 6 is a side elevation of a portion of the carrier wire or cable and segment-shaped body thereon which cooperates with the rotor to suspend and support the cable at an intermediate point and by-pass a supporting ring and its load.

In order that the general relation of the parts and utility of the device may be readily understood, I have shown in Figure 1 one method of installation and use of the intermediate carrier wire or cable suspension means for moving loads along an elevated or suspended wire or cable 1 over rough mountainous terrain 2 on an incline which is difficult for vehicles. In this instance, the points of loading 3, 4 and 5 are usually inaccessible or difficult to reach with vehicles and the dumping or discharge point 6 is a considerable distance therefrom so that the loads must be conveyed over terrain not provided with roads. In the example shown, the installation is for the purpose of moving billets of pulpwood, bolts or logs by gravity by hanging them on a ring which slides downhill on said carrier wire or cable 1 suspended at both ends such as to trees or other upright supports at elevated points as at 7 and 8 where the ends are anchored adjacent the loading point 3 and the dumping or discharge point 6 adjacent a track or road 9 for loading the dumped loads on a truck, railway car or other transporting vehicle for conveyance, transportation or shipment to the desired destination for use. The intermediate suspension points are indicated at 10 upon trees or other upright supports at elevated points, and the suspension means or devices at such intermediate points are generally designated at 11 which are hung as from a limb or other horizontal or cross-support by any suitable overhead fastening of conventional character anchored to the limb or support in any suitable way such as by a hooked rod 12 from which the present suspension means may be hung at intermediate points 10 of the carrier wire or cable 1.

In the physical embodiment of the invention illustrated, the device for intermediate suspension of the carrier wire or cable 1 and for by-passing the moving load, comprises a shackle or clevis hanger 13 which is provided near the top with a suitable means such as a transverse hole 14 to provide for overhead fastening by conventional means or otherwise, such as to receive a split link 15 which may be triangular as shown so that one side takes through the hole 14 and one corner or bight can engage the hook 12 or merely to receive a suspension wire. The lower recessed, forked or bifurcated part of the shackle or hanger 13 provides spaced depending arms 16 having horizontally aligned apertures near their lower ends to receive a pivot pin 17 to serve as an axis for a rotor 18 shown as of segmental shape and adapted to turn thereon, said pin being retained in position by suitable means such as cotter pins 19.

The rotor 18 is provided with a circular peripheral edge portion 20 extending around a greater portion of its circumference and a remaining flat portion 21 disposed as the chord of an arc, so that the rotor is of segmental shape. The rotor is also provided in the circular portion with a peripheral groove or chamber 22 having inturned edge flanges 23 forming a narrow opening 24 therebetween through which the cable 1 extends as the chord of an arc as seen in Figures 2 and 3. The opening or slot 24 thus extends outward from the groove or chamber 22 through the perimeter of the rotor and the flanges 23 form two spaced interior circular tracks or bearings near the perimeter on opposite sides of the flanges or slot laterally at the inner faces of the opposed walls of the rotor and groove or chamber thereof. The rotor may be formed or made up of two segmented discs 25 grooved on the inside in a circular manner to form the chamber or groove 22 when the discs are fastened together at their central portions of circular form centrally within the chamber over a common center having aligned bores to receive the pivot pin 17. Suitable means such as screws 26 may be employed to fasten the discs together through the central circular portions outwardly of the pivot axis or pin 17.

The rotor 18 is provided substantially intermediate the ends of the circular portion 20 with a reentrant mouth or curved recess extending into the same or disks 25 thereof somewhat radially toward its axis a short distance and flared at its outer end with rounded or curved edges diverging toward the periphery with the near or entering side concaved and the far side convex as shown. At the far or lower side of the recess 27, the edges of the rotor 18 or disks thereof are provided with flanged extensions or lips 28 at the periphery to provide abutments below the cable 1 where the periphery of the rotor extends below the same in the normal position of the rotor as seen in Figure 2. These lips 28 taper away from the slots or recess 27 toward the periphery and are spaced apart on opposite sides of the confined or restricted peripheral opening or slot 24 so that the cable 1 may extend through the slot and into the groove or chamber 22 as a chord or tangentially at all times by reason of the rotor fitting thereover.

Means such as a coil spring 29 of the retractile type is provided to hold the rotor in its normal position turned anti-clockwise as seen in Figure 2, one end of the spring being anchored at the top to the shackle or hanger 13 as at 30 and the other or lower end being anchored or fastened to the rotor at a point off-center on the rotor as at 31 to turn the rotor or pulley 18 in an anti-clockwise direction. There is provided means fixed on the cable 1 at the intermediate suspension points adjacent and beneath each rotor 18 cooperating with the groove and flanges or two-track bearing 23 of the rotor to connect the cable and rotor to support and maintain the cable in suspension at all times to support the moving load while permitting turning of the rotor relative to the cable and such means in either direction to by-pass a load. For this purpose, there is provided as a component part of the device but separate from the rotor or rotator, an oppositely tapered body 32 shaped as a segment of a disc as shown in Figure 6 and which may be formed of two sections 33 having opposed grooves in registry forming a longitudinal hole 34 receiving the cable 1 therethrough so that the body is split longitudinally in a vertical plane so that it can be fastened as by screws 35 connecting the sections thereof to clamp the body around the suspended carrier wire at the point or points of intermediate suspension. The ends of the body above the cable may be inclined or tapered as at 36 to form abutments or stop shoulders as will be later described and the bottom surface is convexly arcuate or rounded as the arc of a segment as at 37 to form a curved surface which permits sliding action of the flanges 23 therebeneath as the rotor turns. However, as the body 32 spans the flanges or tracks 23 within the groove or chamber 22 which it may enter at the ends of the latter at the flat portion 21, the connection and support of the rotor with the cable is maintained.

In order to limit turning of the rotator in a clockwise direction, a stop pin 38 is provided across the periphery thereof to engage the cable 1 or adjacent end 36 of the body 32 as seen in Figure 3. This stop pin is positioned between the mouth or recess 27 and the straight or flat chord portion 21 at the right hand side of the rotor and the corresponding end of portion 21, while correspondingly positioned at the opposite side is a similar stop pin 39 which engages the cable or opposite left hand end 36 of the body 32 to limit the anti-clockwise motion of the rotor or pulley 18 as shown in Figure 2 of the drawings.

In the operation of the device, with the parts as in Figures 1 and 2, a ring 40 is engaged on and suspended from the cable 1 to hang a cable loop 41 about a load such as logs 42 at the loading points 3, 4 or 5 as from piles 43. The rotor having been slipped over the wire or cable 1 and the segment or body 32 in the manner described so that the body enters the groove of the rotor at either of its open ends where it is flat or segmented to suspend the wire, is free to pass out of either end while the wire extends from the rotor at any point of the opening or slot 24. As the ring 40 with its suspended load moves along the carrier wire or cable 1 it strikes the lips or abutments 28 and passes into the mouth or recess 27, the rotator having been adjusted with reference to the carrier wire so that the mouth is in position to receive the load carrying ring with the stop pin 39 put in place to engage the wire or body 32 at its left hand end to prevent the rotator from moving in an anti-clockwise direction beyond the proper entry point where it is held under the normal return action of the spring 29. A billet of wood having been hung on the ring 40 which may be similar to a harness ring and which encircles the suspended carrier wire near the loading point or up-hill end of the wire, when the ring is released while carrying the load, it may be moved along the wire or slides down the same by gravity. As it reaches any one of the intermediate suspension devices, it enters the mouth and strikes the lips as previously described, and in the event that the ring at the point of impact is not riding at right angles to the direction of movement, the impact tends to turn the ring to the square or upright position and the impact also rotates the rotator or rotor 18 until the ring in the mouth or recess 27 rides over the segmental body 32 and is discharged from the mouth at the far side as shown in Figure 3 or at the downhill side of the device for continuance of its journey to the dumping point 6 where the load may be placed upon a transporting vehicle. Upon discharge of the ring from the mouth of the rotor, the rotating movement of the ladder is stopped by the stop pin 38 engaging or hitting the carrier wire or right hand end of the body 32. This movement stretches the spring 29 as shown in Figure 3 and after the ring is released and passes down the wire, the spring automatically rotates the rotor from the clockwise position back to the normal or rest position as shown in Figure 2 limited by the pin 39 as previously explained with the mouth or recess 27 in position and ready to receive and by-pass another ring and its supported load with the ring passing over and under the body 32.

The device has several distinct advantages in that by providing one or more intermediate suspensions for the carrier wire along with the ability to by-pass a moving load on the wire, it greatly increases the effective distance possible between the terminal points of the carrier wire such as 7 and 8 and also permits changes in the vertical angle at which the carrier wire may be hung to conform to the contour of the ground surface above which it is hung. The action of the device and especially the rotor in inverting itself, is entirely mechanical, automatic, rapid and positive. The device is also simple in construction and therefore may be economically manufactured and is readily adaptable for various uses of moving a load along a suspended wire and thus a different force than gravity may be used in moving a load or body if the carrier wire is not laid on an incline or down grade. Also, the sliding action of the rotor on the segment body 32 at the flanges or tracks 23 may be changed to provide anti-friction means such as roller or ball bearings on either part and the size of the rotor and mouth thereof can readily be changed to permit passage of different sized or shaped carrier rings.

Having thus fully described my invention, what I claim as new and desire to secure by Letters Patent is:

1. In a suspension mechanism for a carrier cable, a hanger of inverted U-shape having its upper end attached to an overhead support, a rotor comprising a pair of spaced parallel coaxial plates of substantially circular shape, said plates each having a peripheral flange extending inwardly toward the flange of the other plate and spaced to leave an opening between the inner edge of the flanges, a shaft extending through the centers of said plates and journaled in the lower ends of the hanger, the flanges of the plates constituting a track, a body secured to said carrier cable and having on the lower side the same curvature as said flanges, said track adapted to receive and support said body, said body being received between and resting on the inwardly extending flanges of said plates, the upper surface of said body being arranged parallel to said cable, spring means extending between said hanger and said rotor and connected thereto to bias said rotor to its normal position, there being a slot extending radially of each of said plates from the peripheries of said plates toward the centers thereof, and a load-bearing ring having said carrier cable passing therethrough and adapted to engage in said slots, said slots extending inwardly in said plates a distance equal to the sum of the thickness of said body and said ring.

2. In a suspension mechanism for a carrier cable, a hanger of inverted U-shaped having its upper end attached to an overhead support, a rotor comprising a pair of spaced parallel coaxial plates of substantially circular shape, said plates each having a peripheral flange extending inwardly toward the flange of the other plate and spaced to leave an opening between the inner edges of the flanges, a shaft extending through the centers of said plates and journaled in the lower end of the hanger, the flanges of the plates constituting a track, a body secured to said carrier cable and having on its lower side the same curvature as said flanges, said track adapted to receive and support said body, said body being received between and resting on the inwardly extending flanges of said plates, the upper surface of said body being arranged parallel to said cable, spring means extending between said hanger and said rotor and connected thereto to bias said rotor to its normal position; there being a slot extending radially of each of said plates from the peripheries of said plates toward the centers thereof, a load-bearing ring having said carrier cable passing therethrough and adapted to engage in said slots, said slots extending inwardly in said plates a distance equal to the sum of the thickness of said body and said ring, and means for limiting movement of said rotor.

EDMUND O. EHRHART.

REFERENCES CITED

The following references are of record in the file of this patent:

UNITED STATES PATENTS

| Number | Name | Date |
|--------|------|------|
| 904,119 | Downs | Nov. 17, 1908 |
| 1,106,471 | Opsal | Aug. 11, 1914 |